INVENTOR.
HAROLD E. WILSON
BY
ATTORNEY

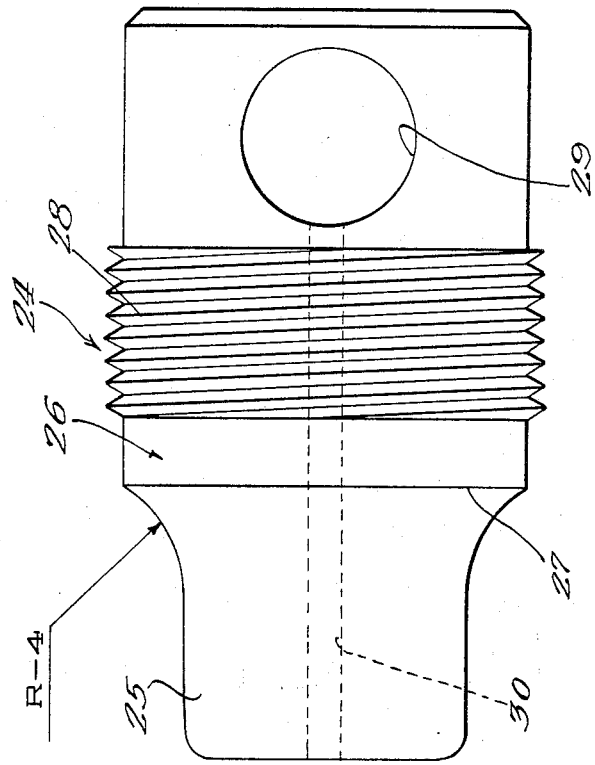
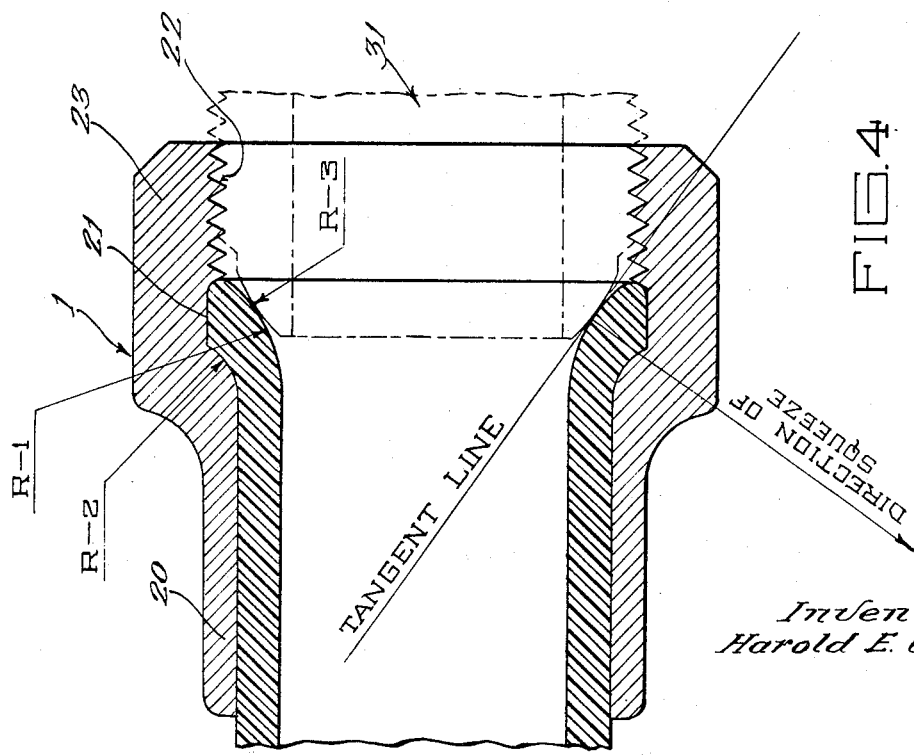

United States Patent Office 3,408,098
Patented Oct. 29, 1968

3,408,098
PLASTIC PIPE FITTINGS
Harold E. Wilson, 3825 Cedar Ave.,
Long Beach, Calif. 90807
Continuation-in-part of application Ser. No. 537,134,
Mar. 24, 1966. This application Apr. 24, 1967, Ser.
No. 633,077
3 Claims. (Cl. 285—247)

ABSTRACT OF THE DISCLOSURE

A coupling for connecting plastic pipe or tubing to brass goods normally used in waterworks, water and gas distribution, and industrial plants that provides a tube nut into which the plastic pipe is flared, locking them together longitudinally, yet permitting relative rotation of the pipe and nut. The flare and tube nut are such as to provide an enlargement on the end of the pipe, captivated in the nut and so arranged that the squeeze on the pipe from a companion coupling part is beyond the enlargement. Thermoplastic pipe having internal diameter iron pipe dimensions and other pipe having outer diameter copper tube dimensions, both of polyethylene or polyvinyl chloride in 3/8" to 2" sizes are popularly used in such couplings.

Cross-references to related applications

This application is a continuation-in-part of my copending application, Ser. No. 537,134, filed Mar. 24, 1966, and now abandoned, entitled "Method of Attaching Plastic Pipe to a Metal Fitting," now amended to the above indicated title.

Background of the invention

Field of the invention

A great need has arisen due to shortage of copper piping and tubing, particularly in waterworks distribution, for the use of plastic pipe. No adequate, fully satisfactory means has been available to couple plastic pipe to the usual brass goods or to iron pipe, meters, valves, curb stops or the like. Most prior couplings use bands about the pipe subject to corrosion in buried service or restricting the flow area in the pipe unsatisfactorily. The present coupling uses a tube nut having none of the disadvantages of prior plastic pipe couplings and insures coupling against pullout of the pipe except by much higher forces than normally occur in use. The present coupling may be buried in the ground indefinitely without deleterious effect.

While no coupling of the type to be described herein is known, some prior tube fittings made of plastics in whole or in part are shown in one or more of the following patents.

Description of the prior art

Patent Nos. 2,366,444, Jan. 2, 1945, J. R. Dorman; 2,439,351, Apr. 6, 1948, G. B. Thayer et al.; 2,545,263, Mar. 13, 1951, J. Corydon; 2,853,320, Sept. 23, 1958, H. E. Liebelt et al.; 3,023,033, Feb. 27, 1962, R. B. Koch.

Summary of the invention

This invention relates to a method and means of attaching a plastic pipe or tubing to a metal fitting, such as a copper or brass fitting or valve.

An object of my invention is to provide a novel method and means to secure a plastic pipe or tubing to a metal fitting, such as a brass or copper fitting in a water line, whereby it is possible to save a considerable amount of copper tubing which is presently in short supply.

Another object of my invention is to provide a novel means of attaching plastic tubular stock to a metal fitting by means of a flaring tool which engages one end of the plastic tubing, and also is inserted into the metal fitting to engage and flare the end of the plastic tubing or pipe.

Another object of my invention is to provide a novel method as stated, wherein the flaring tool is forced into the end of the metal fitting and also enters one end of the plastic tubing to flare one end of the tubing into an appropriate annular recess in the metal fitting, to thus flare the plastic tubing into the metal fitting so that the plastic tubing will be held against withdrawal from the fitting but allow it to rotate, and also will be effectively sealed against leakage.

Still another object is to provide a novel method of the character stated, which can be accomplished in the field by the installation workman, and which does not require unusual or technical knowledge.

Still another object is to provide an attachment of a plastic pipe to a metal fitting, whereby the engaging parts of the metal fitting will co-act with the plastic tubing to effectively hold the tubing in position and seal the same in the metal fitting.

Other objects, advantages and features of invention may appear from the accompanying drawings, the subjoined detailed description and the appended claims.

Brief description of the drawings

FIGURE 4 is an enlarged medial cross-section through a typical tube nut and plastic pipe flared therein with a companion coupling shown in dotted broken outline.

FIGURE 5 is an enlarged side elevational view of an alternate form of tube flaring tool usable with the assemblage of FIGURE 4.

Description of the preferred embodiments

Figure 1:
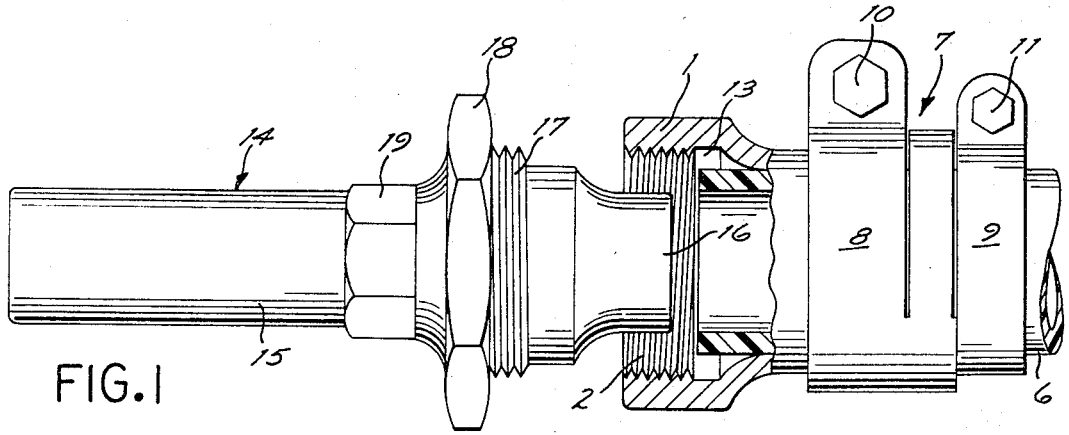
FIGURE 1 is a side elevation partly in section of a metal fitting, and the flaring tool in position to be inserted in the fitting.

Referring more particularly to the drawing, a metal fitting or coupling 1 (a tube nut) which, in the case of a water system installation, is made of copper or brass, and this coupling includes internal threads 2 which are threaded onto a complementary member such as the valve 3. The valve 3 is formed with a threaded nipple 4 which terminates at its outer end in a semi-ball shaped tip 5, the purpose of which will be subsequently described. To complete the water conduit, additional lengths of pipe are attached to the fitting 1 and the valve 3, and frequently this pipe is made of copper or brass. Due to the present shortage of copper and brass I provide a plastic pipe 6 as an effective substitute for the metal pipe.

To effectively attach the plastic pipe 6 to the fitting 1 I employ the following method: The pipe 6 is first inserted into the fitting 1 and is then securely clamped to the fitting by means of an appropriate clamp 7, including a band 8 of a suitable diameter to engage the fitting 1, and a second similar diameter band 9 which engages the plastic pipe 6. These bands are then tightly clamped onto both the fitting 1 and the pipe 6 by suitable bolts, wedges, cams or the like, generally indicated at 10 and 11. When the clamp is in position the parts 1 and 6 will thus be securely held against relative longitudinal movement. The innermost end of the pipe 6 is now heated to an appropriate temperature by a liquid at appropriate temperature, or a torch, or electrical or chemical heating unit, whichever is found most convenient. When the plastic tube 6 is at the proper temperature, soft enough to be deformed manually, around 260° F., the inner end thereof can then be flared, as shown at 12, and the flared end of the plastic pipe will be pressed outwardly into the annular recess 13.

Figure 2:
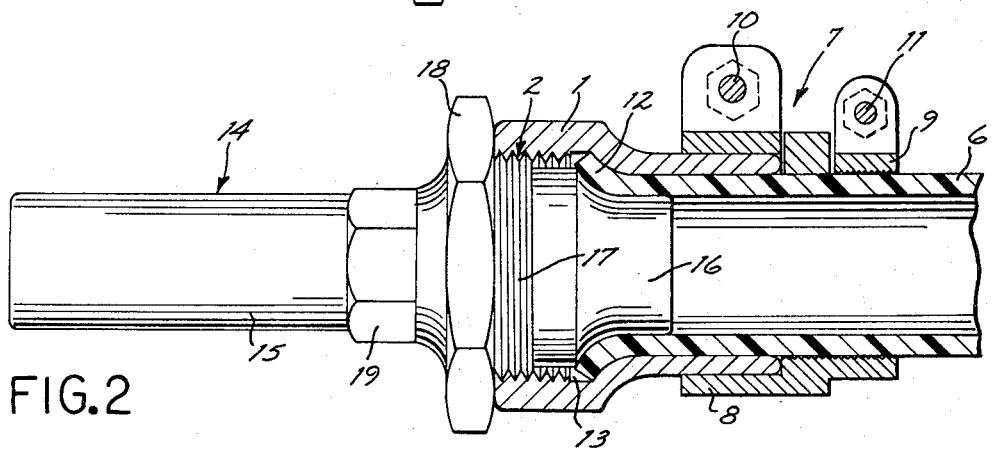
FIGURE 2 is a view similar to FIGURE 1 showing the flaring tool in flaring position.

The flaring of the end of the plastic tube 6 is accomplished by the flaring tool 14. The flaring tool includes a cylindrical bar 15, one end of which is shaped into a truncated cone 16 which enters the inner end of the plastic pipe 6, as shown in FIG. 2. When pressure is applied to the flaring tool 14 the pipe 6 will be flared outwardly, and this is accomplished by the threads 17 on the flaring tool which screw into the threads 12 in the fitting 1. A stop nut 18 may be threaded onto the threads 17 to act as a stop or limiting shoulder to prevent the flaring tool from moving too far into the end of the plastic pipe 6. When the nut 18 has shouldered, the flare 12 will be completed and the flaring tool 14 can now be withdrawn. To rotate the flaring tool 14 I provide the flat faces 19 thereon which are engaged by a wrench. The flaring tool 14 may also be appropriately heated, either by means of a torch, a suitable liquid, or by a self-contained electrical heating unit. If the fitting 1 and the plastic tubing 6 are relatively small in diameter, it might be convenient to eliminate the threads 17 on the flaring tool and manual pressure alone would be sufficient to accomplish the flaring action.

Figure 3:
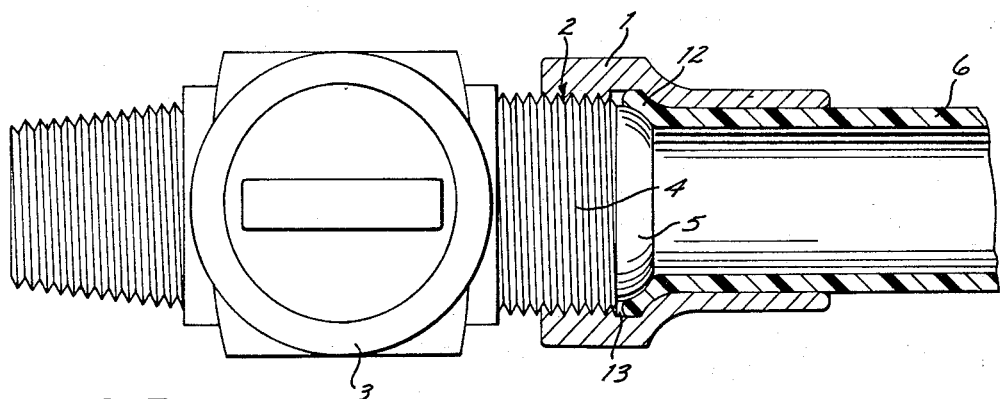
FIGURE 3 is a side elevation partly in section of the metal fitting and the plastic tube positioned therein.

After the flare 12 has been completed, the nut 1 can be threaded onto a second piece of equipment, such as the valve 3, and when the parts are thus assembled as shown in FIG. 3 the spherical-like tip 5 of the valve will engage the flare 12 to hold the flare securely in the recess 13, and also will effectively prevent the pipe or tube 6 from being withdrawn from the nut 1.

The right-hand end of recess 13 in the drawings is a stop shoulder so disposed and arranged as to be contacted by the outwardly extending flare on pipe 6. The stop shoulder and the tip are both surfaces of revolution, concave or convex, but preferably both are convex as shown. When both are convex, a narrowed region is formed which creates a bulbar ring at the outer end of the flare that improves the retention of the pipe. The faces of the flare are congruent to the surface which they abut, and this effect is enhanced if complementary element 3 is threaded into place while the thermoplastic material is still soft.

The plastic pipe or tubing 6 is inserted into the nut 1 to the position shown in FIG. 1. The plastic pipe is either heated before it is thus inserted, or after it is inserted, whichever is most convenient. The flaring tool 14 is now threaded into the open end of the nut 1 and the flaring tool is rotated to force the frustoconical tip 16 into the open end of the tubing 6 and create the flare 12 which moves outwardly into the annular recess 13. The assembled tubing 6 and the nut 1 are now threaded onto the complementary part 3, such as a valve, and the curved tip of the complementary portion will engage and press the flare 12 tightly into the annular recess 13.

It should be understood that ultrahigh and high molecular weight polyethylene and polyvinyl chloride plastic tubing and pipes are made by manufacturers with the internal or external diameters correlated to iron pipe sizes or to copper tubing sizes. For example, in a nominal, 1-inch size plastic tube made to iron pipe sizes, the internal diameter is 1.049" and the outer diameter is 1.349" so that the wall thickness is .150". The same nominal 1-inch size in plastic pipe made to copper tubing sizes has an internal diameter of .875", an outer diameter of 1.125" and a wall thickness of .125".

The nominal 1-inch iron pipe size plastic tubing with the proper tube nut and flaring tool is shown in FIGS. 4 and 5, by way of example. The tube nut 1 is shown with its sleeve part 20 closely embracing the outer diameter of the plastic tubing. This cylindrical surface in the sleeve part joins a curved transition surface flaring outwardly which is of the radius marked R–2. In this particular size, the R–2 radius is about ¼". The transition surface stops abruptly at surface 21 which is circular cylindrical and about ¼" in longitudinal length. The surface 21 is to receive the end of the flared tubing and by having a ¼" length, exceeds the wall thickness of the plastic tubing which is only .150". The diameter of the surface 21 is generally equal to or larger than the root diameter of the threads 22 in the nut portion 23 of the tube nut.

A properly flared plastic tubing will have a curved, outwardly-directed internal flared surface on the radius marked R–1. This radius will be approximately twice the radius R–2 and for the particular example is preferably ½". The flared radius is caused by the ½" radius surface marked R–4 on the flaring tool 24 (FIG. 5). The nose 25 on the flaring tool will have a cylindrical surface to fit within the plastic tubing with a clearance of about .004" to .014". On the flaring tool, immediately adjacent the curved surface R–4 is a cylindrical surface 26 with a sharp corner 27 between it and the curved surface. The diameter of the cylindrical surface 26 is as close as can be made to the crest diameter of the female threads 22 in the tube nut. Surface 26 extends over the female threads 22 in the tube nut very closely in order to shut off flow of any plastic which might tend to extrude in over the female threads in the tube nut during the flaring operation. The flaring tool surface on radius R–4 may be made instead with a surface of the shape and radius R–3, if desired, so that the companion piece 31 will have a surface contact with the plastic pipe on making a connection.

For convenience, a cross-hole 29 in the rear of the flaring tool can receive a cross handle and an opening or bore 30 from the end of the flaring tool to the cross-hole will allow pressure relief by allowing the escape of water should the threading of the flaring tool into the tube nut occur when water fills the plastic tubing.

In FIG. 4 a nipple on a companion coupling member is shown in dotted outline at 31. Coupling members of valves, pipes, meters and other brass goods in use in the industry generally have a standard curved end on the radius indicated R–3. When this coupling member is threaded into the tube nut in which the plastic pipe is already captured by the flare, surface R–3 will contact the flared internal surface R–1 of the plastic pipe along a tangent line so marked. The thrust on the plastic pipe will be both longitudinal and radial and its resultant will generally be in the direction of the arrow. The point of contact is beyond the enlargement of the end of the plastic pipe, thus aiding the retention of plastic pipe in the tube nut against longitudinal pullout.

While the foregoing example was given for 1-inch iron pipe size plastic tubing, it should be understood that each tube nut and flaring tool is correlated to the volume of the plastic material which should be displaced to make the enlargement at the end and to capture the enlargement between the curved transition surface and the female threads in the tube nut. Heating polyethylene pipe with a torch on the outside until it can be indented from the inside easily with a person's finger will give a proper flare. Once flared, the pipe and nut stay together regardless of the nature of the companion member 31 threaded into the nut. The nut can be of standard materials, even in chemical plants, carrying liquids or fluids which would attack the materials but not the plastic. Iron pipe or a stainless steel pipe having a nipple such as 31 can be threaded into the tube nut and against the plastic pipe whereupon none of the liquid carried would reach the tube nut. In addition, the tube nuts can be made with various style threads, national pipe tapered threads, straight lock nut or straight mechanical threads, or American Water Works Association specification threads with equal facility as far as connection to plastic pipes is concerned.

While I have shown and described certain embodiments of my invention, it is to be understood that it is capable of many modifications. Charges, therefore, in the construction and arrangement may be made without departing from the spirit and scope of the invention.

I claim:
1. A tube nut for coupling a plastic tube to a coupling, comprising: a plastic tube, an integral metal tube nut having a nut part and an adjacent sleeve part, the sleeve part being hollow with an internal diameter cylindrical surface to embrace the outer surface of the undeformed plastic tube, the nut part being interiorly enlarged relative to the sleeve part and having a female thread with root and crest diameter both larger than the internal diameter of the sleeve part; an internal cylindrical wall of substantially said thread root diameter in tandem with the thread; and a convex curved wall transition surface extending from said internal cylindrical wall to the internal cylindrical surface in said sleeve part with the center of curvature of the transition surface being exterior of the tube nut, said plastic tube being flared about the transition surface and into contact throughout the cylindrical wall trapped between the transition surface and the threads in the nut part axially locking the tube and nut together but allowing relative rotation between the nut and tube.

2. A tube nut as specified in claim 1 wherein the cylindrical wall between the thread and the transition surface has a longitudinal length in excess of the thickness of the plastic tube permitting a bulbous enlargement of the plastic tube against the cylindrical surface.

3. A thermoplastic tube coupling, comprising: a plastic tube end and an internally threaded tube nut about such end, the tube end having an outwardly extending flare and an enlargement at the extremity thereof of a greater dimesion than the wall thickness of the tube, the tube nut having an internal cylindrical surface, an internal outwardly flaring convex curved surface and a cylindrical recess surface between its curved surface and threads, said curved surface extending from said internal cylindrical surface to said cylindrical recess surface, said cylindrical recess surface having a diameter substantially equal to the root diameter of said threads, the tube flare laying against the nut curved surface and the enlargement filling the recess surface axially locking the nut and tube together but allowing relative rotation between the nut and tube, and a companion coupling member threadable into the nut and against the tube flare clamping the tube end between itself and the curved surface in the nut with the enlargement trapped exteriorly of the clamping area between the tube nut and the companion coupling member.

References Cited
UNITED STATES PATENTS

| | | | |
|---|---|---|---|
| 1,013,598 | 1/1912 | Gracey | 285—334.5 X |
| 1,307,537 | 6/1919 | Cole | 285—334.5 X |
| 2,165,626 | 7/1939 | Ford | 285—334.5 X |
| 2,189,566 | 2/1940 | Kreidel | 285—334.5 X |
| 2,439,351 | 4/1948 | Thayer et al. | 285—334.5 X |
| 2,534,198 | 12/1950 | Guarnaschelli | 285—334.5 X |
| 3,047,937 | 8/1962 | Vecchi | 285—55 X |
| 3,253,841 | 5/1966 | Ahmad | 285—55 X |
| 3,269,756 | 8/1966 | Bloom | 285—247 |

THOMAS F. CALLAGHAN, *Primary Examiner.*

PO-1050
(5/69)

UNITED STATES PATENT OFFICE
CERTIFICATE OF CORRECTION

Patent No. 3,408,098      Dated October 29, 1968

Inventor(s) Harold E. Wilson

It is certified that error appears in the above-identified patent and that said Letters Patent are hereby corrected as shown below:

Column 5, line 8, following "substantially" insert -- no less than--.

Column 6, line 5, cancel "equal to" and insert --no less than--.

SIGNED AND
SEALED

SEP 30 1969

(SEAL)
Attest:

Edward M. Fletcher, Jr.
Attesting Officer

WILLIAM E. SCHUYLER, JR.
Commissioner of Patents